United States Patent Office 2,800,294
Patented July 23, 1957

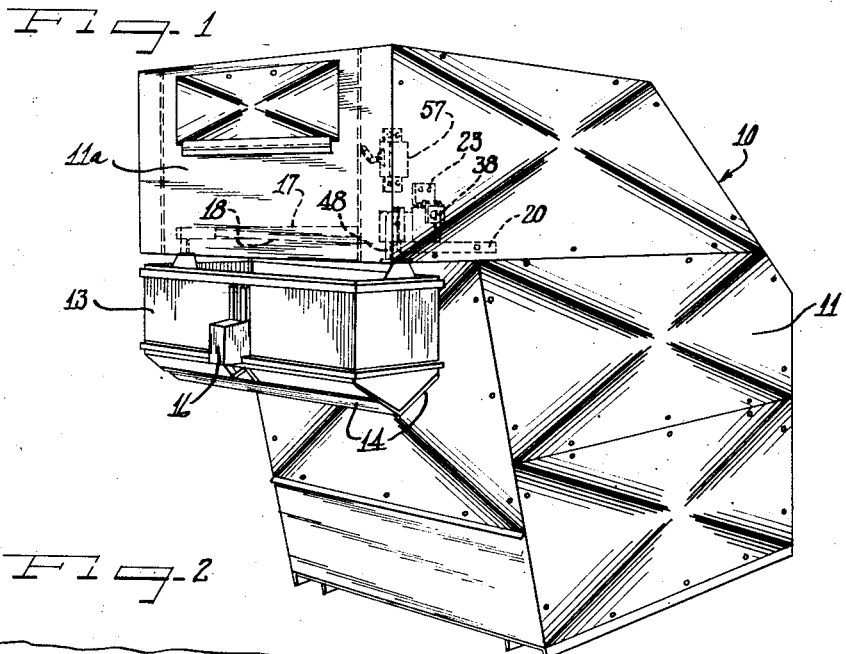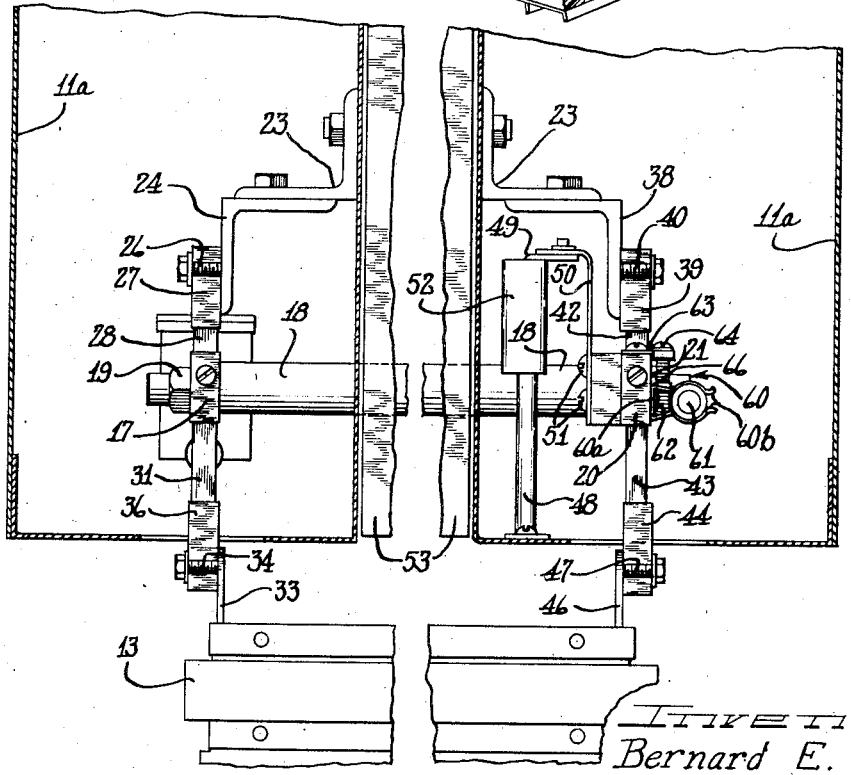

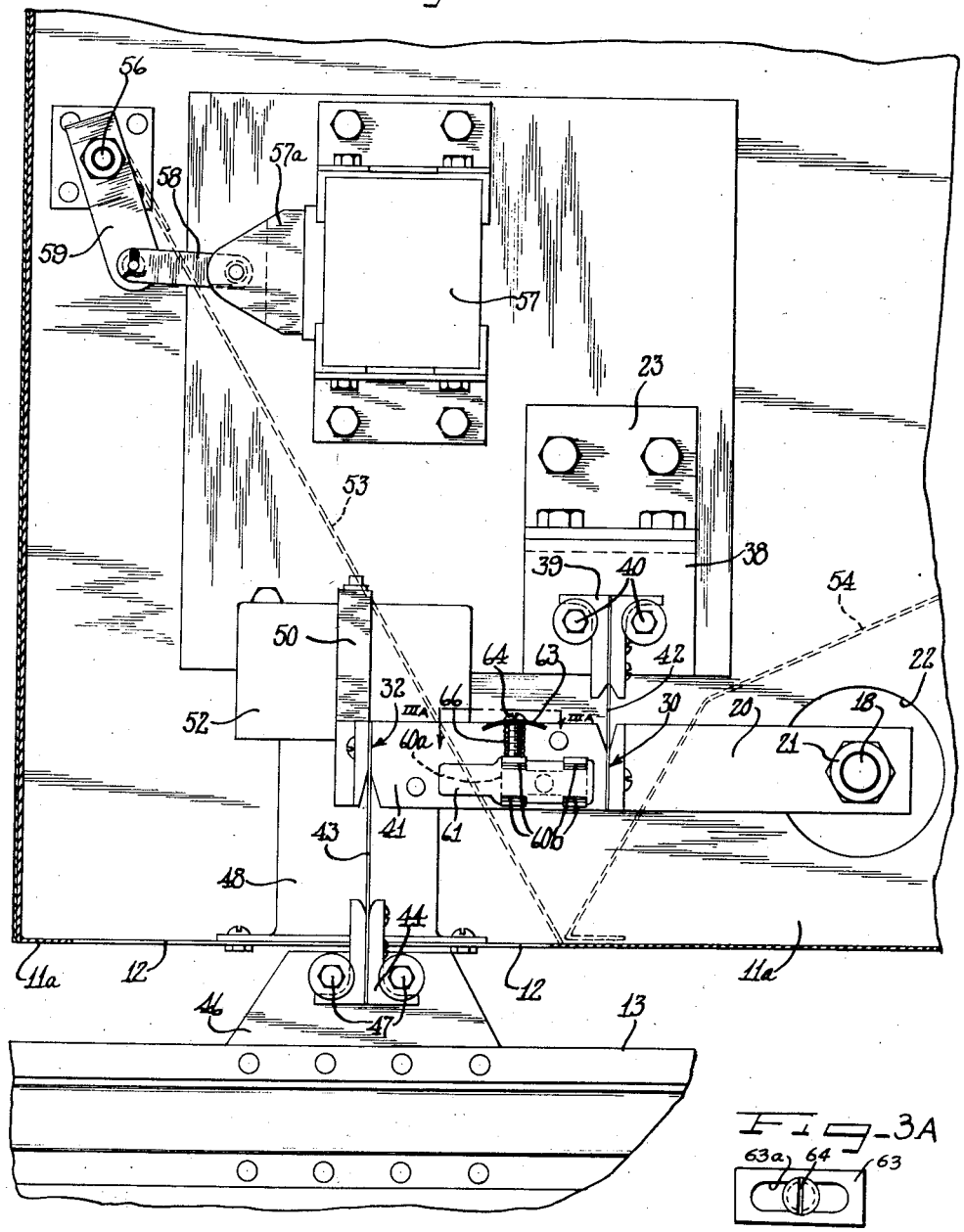

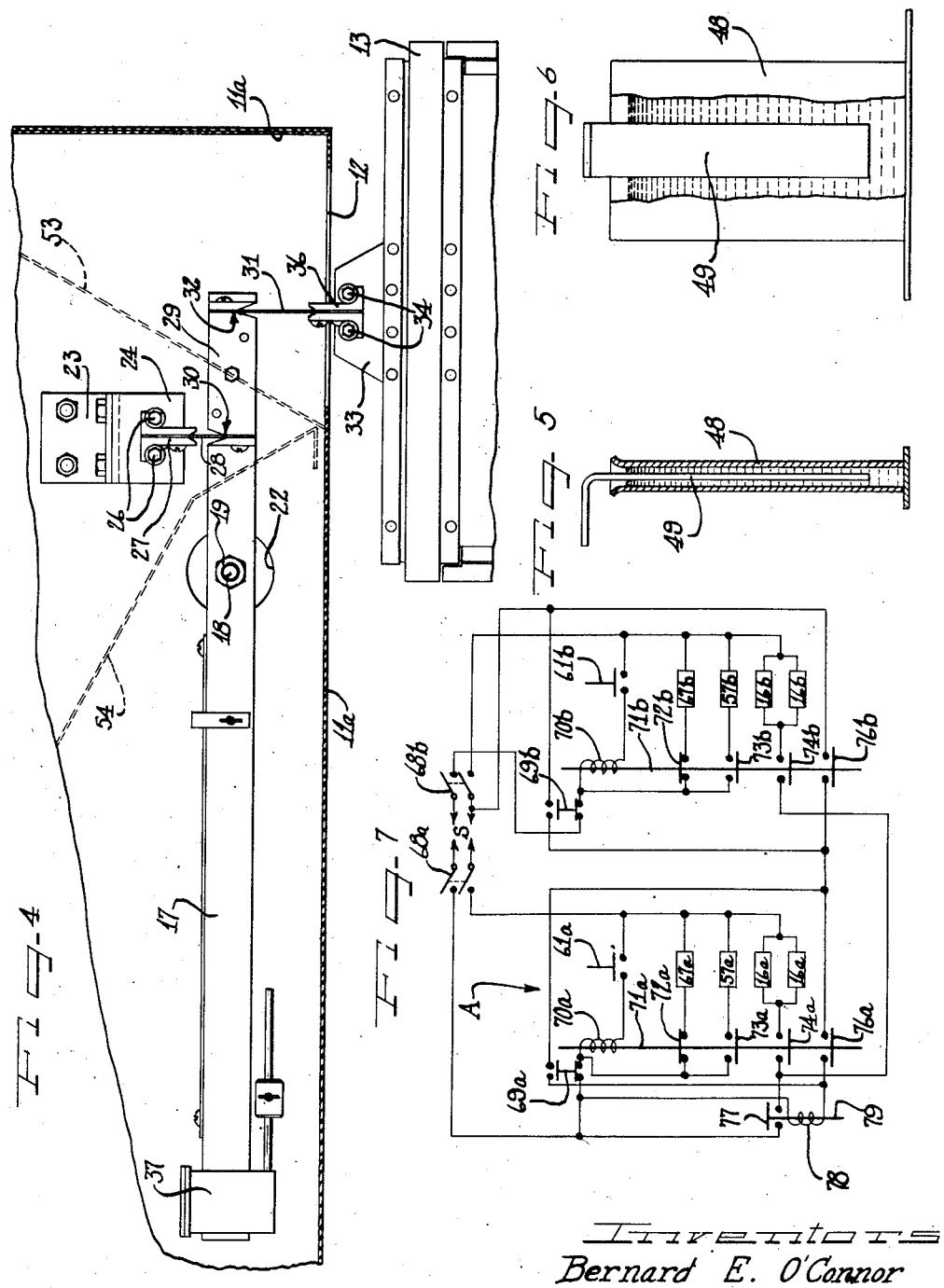

2,800,294

ADJUSTABLE SWITCH MECHANISM FOR FIBER FEEDING AND WEIGHING MECHANISM

Bernard E. O'Connor and Robert E. King, Buffalo, N. Y., assignors, by mesne assignments, to Indiana Commercial Filters Corporation, Lebanon Ind., a corporation of Indiana Original application May 6, 1949, Serial No. 91,772, now Patent No. 2,660,393, dated November 24, 1953. Divided and this application January 5, 1953, Serial No. 336,685

2 Claims. (Cl. 249—4)

This disclosure is a division of our parent application, Serial No. 91,772, filed May 6, 1949, now Patent No. 2,660,393.

An important object of this invention is to provide an improved weighing mechanism which is adapted to automatically control the measurement of fibers delivered by a fiber feeding machine and which may be calibrated for extremely efficient sensitivity through a wide range of adjustability.

According to the general features of the present invention, a fiber feeding machine is provided having a hopper with a discharge opening controlled by a solenoid operated control valve and a weighing hopper disposed subjacent the discharge opening. The weight box is made a part of a weighing mechanism of the type including a counterweighted scale arm. The weighing mechanism is mounted on spring steel straps thereby assuring a virtually friction-free suspension.

Dumping doors provided on the weigh box are controlled by solenoids which, together with a solenoid arranged to regulate the operation of the control valve aforementioned may be energized in response to movement of a mercury switch mounted on the weigh bar or scale arm of the weighing mechanism.

The present invention further contemplates the provision of a novel and improved mercury switch assembly which affords calibration and adjustment of the angle of the mercury switch relative to the weigh bar through a wide range. Circuit means including a novel arrangement of electrical elements are provided so that individual fiber feeding machines may be operated individually or may be switched into or out of a battery at will.

The specific nature of the present invention, as well as additional features and other objects and advantages, will become manifest to those versed in the art upon making reference to the detailed description which follows and the annexed sheets of drawings in which:

Figure 1 is a perspective view of a fiber feeder machine embodying the principles of our invention;

Figure 2 is a front elevational view with parts broken away and partly in section showing a portion of the weighing mechanism of the fiber feeder shown in Figure 1;

Figure 3 is a side elevational view with parts broken away and partly in secion showing additional details of the weighing mechanism of the feeder shown in Figure 1;

Figure 3A is a fragmentary cross sectional view taken substntially on line AA of Fig. 3;

Figure 4 is a fragmentary side elevational view with parts broken away and partly in section showing a portion of the weighing mechanism as seen from the side of the fiber feeder opposite from that depicted in Figure 3;

Figure 5 is a fragmentary enlarged cross-sectional view of a damping structure according to this invention;

Figure 6 is a front elevational view with parts removed showing addtional details of construction of the damper structure shown in Figure 4; and Figure 7 is a circuit diagram of a control system according to our invention.

As shown on the drawings:

The reference numeral 10 indicates a fiber preparation machine commonly known as a feeder which operates to disintegrate fibers after they have passed through bale breakers and the like. Those versed in the art will recognize that the feeder 10 is of the type conventionally used to further disintegrate fibers before they are passed to a blending machine or a mechanical cleaner or other fiber preparation machine employed prior to delivery of fibers to the pickers in the picking room.

Because the present invention is specifically directed to various improvements which are specifically related to the automatic weighing mechanism of the feeder 10, as well as to methods of operating a plurality of feeder units so improved individually or in line as a battery, it is not believed to be necessary to burden this description with a full disclosure of the various unrelated portions of the feeder 10.

It may be noted, however, that the feeder 10 is provided with a body which may be of a welded steel construction to define a hopper 11 having an upper section 11a arranged to define a discharge aperture 12 (Figure 3).

A weigh box or hopper 13 is positioned subjacent the discharge aperture 12 so as to receive the fibers delivered by the feeder 10.

The weigh box or hopper 13 may be provided with dumping doors 14 (Figure 1) which are controlled by solenoids 16 arranged on each side of the weigh box or hopper 13.

The weigh box or hopper 13 may be made an integral part of an automatic weighing mechanism of the balance type including a weigh bar or scale arm 17 (see Figures 1 and 4) which may be supported for relative pivotal movement by the upper section 11a of the hopper 11.

According to this invention, the weighing mechanism is mounted in a novel manner by the provision of a unique suspension structure.

Because of the elongated form of the weigh box or hopper 13, it may be desirable to provide dual suspension points for the weighing mechanism.

Accordingly, the weigh bar 17 is connected to a cross bar 18 provided with a reduced diameter end portion extending through the weigh bar 17 and suitably threaded to receive a locking nut 19.

The cross bar 18 extends transversely across the feeder unit 10 and has a reduced diameter end portion receivable in an auxiliary weigh bar 20 which may also be suitably threaded to receive a locking nut 21. Apertures 22 may be provided in the sides of the feeder structure to provide free accommodation of the cross bar 18.

As will be noted upon making reference to Figures 2, 3 and 4, suitable clip angles 23 may be fastened to the respective sides of the feeder unit 10 to provide support for each respective end of the weighing mechanism.

Making particular reference to Figures 2 and 4, it will be noted that an additional clip angle 24 provided with suitably threaded apertures to receive bolts 26 is fastened to one of the clip angles 23. A T-shape hanger 27 is provided which may be conveniently made from two separate pieces of angle iron placed back to back so as to clamp a spring steel suspension strap 28 therebetween. The extending legs of the T-shape hanger 27 may be aligned superjacent the bolts 26 after which the T-shaped hanger 27 may be firmly assembled with the clip angle 24 by taking up the bolts 26. It will be apparent that suitable washers may be provided to abut the edges of the T-shaped hanger 27.

The weigh bar or scale arm 17 is provided with a weigh bar hanger 29 on its end portion which is adapted to define a pair of pivot supports arranged in predetermined spaced relationship. The pivot points may be conveniently formed by beveling respective corners of the weigh bar hanger 29 and assembling a similarly beveled clamping portion thereto. Thus, it will be apparent that one of such clamping portions may be secured to the weigh bar hanger 29 so as to clamp the spring steel suspension strap 28 at the locale of the pivot point identified by the reference numeral 30 (Figure 4).

The other clamping portion of the weigh bar hanger 29 may be suitably arranged to clamp upon a second spring steel suspension strap 31 at the locale of a pivot point indicated by the reference numeral 32 (Figure 4).

The weigh box or hopper 13 may be provided with a suitable upstanding lug 33 defining suitable threaded apertures for receiving bolts 34 which, in turn, serve to support a T-shaped hanger 36 clamped to the free end of the spring steel suspension strap 31.

It will be understood that the weigh bar or scale arm 17 may be provided with the usual counterweight 37 and calibration mechanism so as to permit adjustment of balance in the weighing mechanism.

The suspension arrangement on the other side of the weighing mechanism is quite similar to that already described in connection with the weigh bar or scale arm 17 and, as may be seen in Figures 2 and 3, includes a clip angle 38 upon which is mounted T-shaped hanger 39 by means of the bolts 40. An auxiliary weigh bar hanger 41 is provided and a spring steel suspension strap 42 is connected between the T-shaped hanger 39 and the auxiliary weigh bar hanger 41 to form a pivot point correspondingly identified by the reference numeral 30.

A spring steel suspension strap 43 connected to the end of the auxiliary weigh bar hanger 41 is clamped by a T-shaped hanger 44 fastened to an upstanding lug 46 of the weigh box or hopper 13 by a pair of bolts 47 to form a pivot point 32.

It will be apparent that the description thus far has set forth a suspension arrangement which is virtually free of frictional interference. The only substantial detrimental force which conceivably could be introduced is that caused by the slight flexing of the steel suspension straps when the weigh box or hopper 13 moves during the course of operation. It may be noted that such a flexing force will remain constant and for all practical purposes may be considered negligible.

Those versed in the art will recognize that the described suspension arrangement permits a wide range of adaptation insofar as the facility of the weighing system is concerned. For example, it should be noted that in a stable system the weigh bar pivot point corresponding to pivot point 30 in the present embodiment is spaced above a longitudinal axis and the points of support for the weigh box and the counterweight will be spaced relatively below said longitudinal axis. Thus, within angular limitations, when the weigh box moves downward the counterweight lever arm will increase while the weigh box lever arm will decrease. Assuming, as in the present embodiment, that the weigh box is moved by the incremental addition of fibers or similar material, a stable system assures that the weigh box will return to its initial position because the counterweight will be operating through an increased lever arm after dumping of the fiber or material has occurred.

On the other hand, in an unstable system, the weigh bar pivot point will be disposed relatively below a longitudinal axis while the support points of the weigh box and the counterweight will be disposed above such an axis. Thus, in an unstable system, within angular limitations, the lever arm between the pivot point and the point of support of the weigh box will increase as the box moves downward and the lever arm between the counterweight and the pivot point will decrease. In such an arrangement the box will not return to its initial position after the weight has been dumped therefrom.

In the present arrangement the amount of stability of the weighing system may be closely controlled by adjusting the relative positions of the pivot points 30 and 32. An initial stability characteristic may be experimentally determined and provided for the weighing mechanism.

Because of the friction free suspension arrangement described above, the weigh box or hopper 13 would ordinarily oscillate up and down after each successive dumping operation if a damping medium were not introduced. Inasmuch as automatic control of the weighing system in the present invention is dependent upon an automatic switch mechanism which will be described presently, such oscillation of the weigh box or hopper 13 would introduce inaccuracy by causing the automatic switch to operate at a false position.

According to this invention a damper is provided which employs the principle of the thrust resistance of shear film of a viscous fluid operating between opposed parallel working surfaces relatively movable in their respective planes.

Referring particularly to Figures 2, 3, 5 and 6, a damping structure is indicated which comprises a container 48 provided with spaced upstanding wall portions and securely fastened to the relatively stationary body of the feeder unit 10. The container 48 is filled with a silicone damping fluid or the like having a viscosity in the neighborhood of 30,000 centistokes. The use of a silicone fluid is preferable because a damping medium is thereby produced which is constant in a physical sense and little affected by temperature variations.

Opposed working surfaces are provided by a blade 49 which extends into the container 48 and is substantially immersed in the damping medium. The end of the blade 49 may be flanged so as to facilitate firm connection to a clip angle 50 made integral with one end of the auxiliary weight bar 20 by means of fasteners 51.

The container 48 may be suitably enclosed by a cover 52; the cover 52 being preferably connected to the blade 49 by means of brazing or some similar method for movement relative to the container 48.

In operation, the damper substantially eliminates oscillation of the weighing mechanism. In addition, damping is obtained without the introduction of friction inasmuch as the layers of viscous fluid between the spaced walls of the container 48 and the blade 49 afford a thrust resistance thereby permitting slow relative movements of the weighing system but resisting rapid movement due to the shear resistance of the films of the viscous fluid between the working surfaces. Upon tripping of the weighing mechanism, the damper takes command and almost instantly brakes the movement and permits the balance to return immediately to a static position.

The operation of a fiber feeder unit usually requires that after a predetermined weight of fibers has been deposited in the weigh box or hoppers 13, the motor operating the fiber feeder unit 10 should be deenergized. Those versed in the art, however, will recognize that the operating mechanism of a fiber feeder unit 10 does not stop immediately but coasts for several revolutions after the electric current to the operating motor has been turned off. These added revolutions cause additional fibers to be directed to the discharge opening 12 of the fiber feeder unit 10 which drop into the weigh box or hopper 13 thereby causing inaccuracies as to weigh proportions.

According to the present invention, the fiber feeder unit 10 is provided with an arrangement which permits precise and exact proportioning of the quantity of fiber deposited in a weigh box.

The arrangement contemplated by the present invention includes a valve plate 53 (Figures 2, 3 and 4) which is placed in control of the discharge opening 12 in the upper section 11a of the hopper 11. As will be noted in Figures 3 and 4, the valve plate 53 cooperates with an inner partition 54 formed in the body of the hopper 11.

To insure strategic operation of the valve plate 53, an automatic actuating system is provided according to the present invention. Thus, the valve plate 53 may be keyed to a suitable shaft 56 extending transversely across the fiber feeder 10 for pivotal movement relative to the discharge opening 12. Thus, rotation of the shaft 56 will place the valve plate 53 in a forward position so as to permit free passage of fibers from the feeder 10 into the weigh box or hopper 13.

In order to impart the necessary rotation to the shaft 56 in correlation with the requirements of the weighing system, a solenoid, indicated generally by the reference character 57, is provided which may be attached to one wall of the feeder unit 10. The solenoid 57 is provided with a plunger 57a to which may be linked a lever arm 58 keyed to a shaft lever arm 59 thereby permitting translation of the reciprocatory movement of the solenoid plunger 57a into an angular displacement of the shaft 56.

It will be apparent that energization of the solenoid 57 simultaneously with deenergization of the operating motor of the feeder unit 10 will preclude the introduction of superfluous fibers into the weigh box or hopper 13 once a specific weight allocation has been attained because the valve plate 53 will close the discharge opening 12.

Automatic control of a fiber feeder unit depends upon the energization and deenergization of certain electrical elements upon the entry of a predetermined quantitative weight value of fibers fed into the weigh box or hopper of the feeder unit. Those versed in the art have heretofore found it advantageous, therefore, to employ mercury switches for making or breaking contacts when the weigh bar or scale arm of the weighing mechanism has been displaced through a predetermined angular displacement.

According to the present invention, a switch assembly has been provided whereby the angle of a mercury switch with relation to the weigh bar of a weighing mechanism may be closely controlled within certain limits. It will be evident that the angle of the switch with relation to the weigh bar is very important and calibration of a weighing mechanism is extremely difficult unless a facile means of adjustment is provided.

The present invention contemplates the provision of a clip 60 having a body portion 60a and spaced resilient prongs 60b extending in a plane normal to that developed by a flat body 60a. A conventional mercury switch 61 may be inserted and resiliently retained by the prongs 60b. The clip 60 is secured for relative pivotal movement to the auxiliary weigh bar 20 by means of a fastener 62.

A bracket 63 is provided which may be securely fastened to the top edge of the auxiliary weigh bar 20. The bracket 63 is provided with a forwardly extending arcuate portion suitably perforated so as to define a substantially longitudinal adjusting slot 63a for passing an adjusting screw 64. The screw 64 threadedly engages a nut made integral with the clip 60 and may be drawn up against the resilience of a small coil spring 66 so as to lock the clip 60 in any selected angle of displacement relative to the auxiliary weigh bar 20, as may be desired, within the limits prescribed by the substantially longitudinal slot formed in the bracket 63.

Referring now to Figure 7, a schematic circuit diagram is shown illustrating how a plurality of fiber feeder units 10 may be electrically connected to facilitate the novel and improved methods of operation contemplated by the present invention.

For the sake of clarity, like reference numerals have been applied to like structural elements as previously described and for the purposes of explanation it will be assumed that two fiber feeder units 10 are to be electrically connected for selective individual or battery operation. The respective fiber feeder units will be hereinafter identified by the reference characters A and B.

As will be noted upon Figure 7, each fiber feeder unit A, B is provided with dumping door solenoids 16a, 16b, valve solenoids 57a, 57b, an operating motor 67a, 67b, and a single mercury switch 61a, 61b.

Current from a source S may be introduced into the circuit by closing a pair of two-pole power switches 68a, 68b. Further control of the electric circuit will then reside in a pair of selector switches 69a, 69b. The selector switches 69a, 69b are of the conventional two-position type and may be selectively actuated to an "on" or "off" position.

Suitable relay means may be provided including coils 70a, 70b cooperable with linkages 71a, 71b to control actuation of a plurality of contacts associated therewith. A normally closed contact 72a, 72b is provided for each respective operating motor 67a, 67b; a normally open contact 73a, 73b is provided for each respective valve solenoid 57a, 57b; a normally open contact 74a, 74b is provided for each respective pair of dumping door solenoids 16a, 16b; and a normally open master solenoid contact 76a, 76b is also provided, the utility of which will become evident presently.

Assuming for the moment that the two-pole power switches 68a, 68b are closed and the selector switches 69a, 69b are both actuated to the "on" position, it will be evident that a normal operating condition has been provided. In this condition, the respective operating motors 67a, 67b will be energized and the valve in the discharge openings of the fiber feeder hoppers will be open.

As soon as the weigh box or hopper is filled with a sufficient quantity of fiber to tilt the preset weigh bar or scale arm downwardly, a mercury switch 61a or 61b will make contact. It will be apparent that various weight settings may be made according to the requirements of the proportional mix to be turned out by each respective fiber feeder. Therefore, as contemplated by this invention the respective mercury switches in a battery of fiber feeder machines will be actuated at different times during an operational time sequence.

As soon as contact is made by a mercoid switch 61a or 61b, the coils 70a, 70b associated therewith will become energized and will actuate the associated linkages 71a, 71b to move all of the contacts connected thereto to a second position. Thus, conatcts 72a, 72b will be opened and the operating motors 67a, 67b will be deenergized. Contacts 73a, 73b will be closed and the valve solenoids 57a, 57b will be energized so as to actuate the respective valve plates associated therewith to a closed position.

Assuming that only the single mercoid switch 61a of the fiber feeder A has operated in a normal time sequence, it will be noted that the dumping door solenoids 16a will not be energized upon closing of the contacts 74a because a master contact 77, normally open, is connected in series therewith. The master contact 77 is controlled by a coil 78 of a suitable relay including a linkage 79 and the coil 78 is placed in series with the master contacts 76a, 76b.

In this manner, even though the contacts 74a and 76a have been closed, the dumping doors associated with the dumping door solenoids 16a will remain closed until such time as the fiber feeder machine B has completed its operative cycle.

When the coil 70b actuates the linkage 71b and closes the contacts 74b and 76b, the coil 78 will be energized thereby actuating the linkage 79 and closing the master contact 77. When this occurs, the dumping door solenoids 16a and 16b will both be energized simultaneously and therefore the dumping doors will open at the same time to permit the discharge of the fibers in the respective weigh boxes onto a common conveyor.

If it is desired to operate a machine individually or if it is necessary to pull one or more machines out of battery, a respective selector switch such as 69a or 69b may be actuated to an "off" position. It will be noted that the arrangement indicated on Figure 7 permits the selector switches 69a, 69b to accomplish a selective by-passing of an associated master contact 76a or 76b.

Being in series with one another, the master contacts, if by-passed, will permit immediate energization of the master relay and actuation of the dumping doors will occur without requiring the additional completion of a weighing cycle on the feeder or feeders taken out of the battery.

It will be apparent to those versed in the art that the circuit arrangement described permits the operation of a plurality of fiber feeder machines in battery simultaneously, individually or in any conceivable combination desired. Furthermore, the employment of a single mercury switch to control an entire operational sequence of a fiber feeder machine eliminates the necessity for fine adjustment of multiple switches as has been previously required in obtaining simultaneous operation of fiber feeder apparatus.

It is contemplated that many minor modifications may be suggested to those versed in the art upon analysis of the aforegoing disclosure which will not mark a substantial departure from the true spirit of our invention. It is to be understood, therefore, that we do not propose to be limited to the specific details which we have set forth for the sake of clarity and by way of illustrative example only.

We claim as our invention:

1. In a weigh bar mechanism of the kind described, a clip connected to the weigh bar for pivotal movement relative thereto and parallel with the pivot of said bar, a bracket fixedly carried by said bar and having an elongated arcuate portion extending lengthwise of the bar, and in spaced overlying relation to the clip, said arcuate portion of the bracket being provided with a slot running lengthwise the bar, screw means extending through said slot and threaded into said clip at a point offset from the clip pivot, a biasing coil spring surrounding said screw between said bracket and said clip, and a mercury switch in said clip, whereby the angle of said mercury switch relative to said weigh bar may be adjustably varied within the limits prescribed by said bracket.

2. In a weigh bar mechanism as defined in claim 1, said bracket being curved and having a radius of curvature extending generally towards the pivot center of said clip, said screw means comprising a screw having a head overlying the edges of said slot on one side of said bracket, and said coil spring around said screw bottomed at one end against said clip and bottomed at the other end against the other side of said bracket, thereby to resiliently lock said clip at selective positions of adjustment.

References Cited in the file of this patent

UNITED STATES PATENTS

| | | |
|---|---|---|
| 849,418 | Nickerson | Apr. 9, 1907 |
| 1,317,135 | Holt | Sept. 23, 1919 |
| 1,540,866 | Samuelson et al. | June 9, 1925 |
| 1,611,219 | Minninger | Dec. 21, 1926 |
| 1,667,056 | Smith | Apr. 24, 1928 |
| 1,676,791 | Mailev | July 10, 1928 |
| 1,759,886 | Bousfield | May 27, 1930 |
| 2,006,255 | Best | June 25, 1935 |
| 2,076,640 | Howard et al. | Apr. 13, 1937 |
| 2,098,226 | Charter | Nov. 9, 1937 |
| 2,100,874 | Ryan | Nov. 30, 1937 |
| 2,144,705 | Ober | Jan. 24, 1939 |
| 2,207,885 | Howard | July 16, 1940 |
| 2,232,590 | Craig | Feb. 18, 1941 |
| 2,387,585 | Howard | Oct. 23, 1945 |
| 2,412,506 | Greene et al. | Dec. 10, 1946 |
| 2,429,083 | Vetter | Oct. 14, 1947 |
| 2,449,177 | Perry | Sept. 14, 1948 |